No. 838,483. PATENTED DEC. 11, 1906.
S. B. WELCOME.
COMBINED CLUTCH AND BRAKE.
APPLICATION FILED JUNE 20, 1906.
2 SHEETS—SHEET 1.
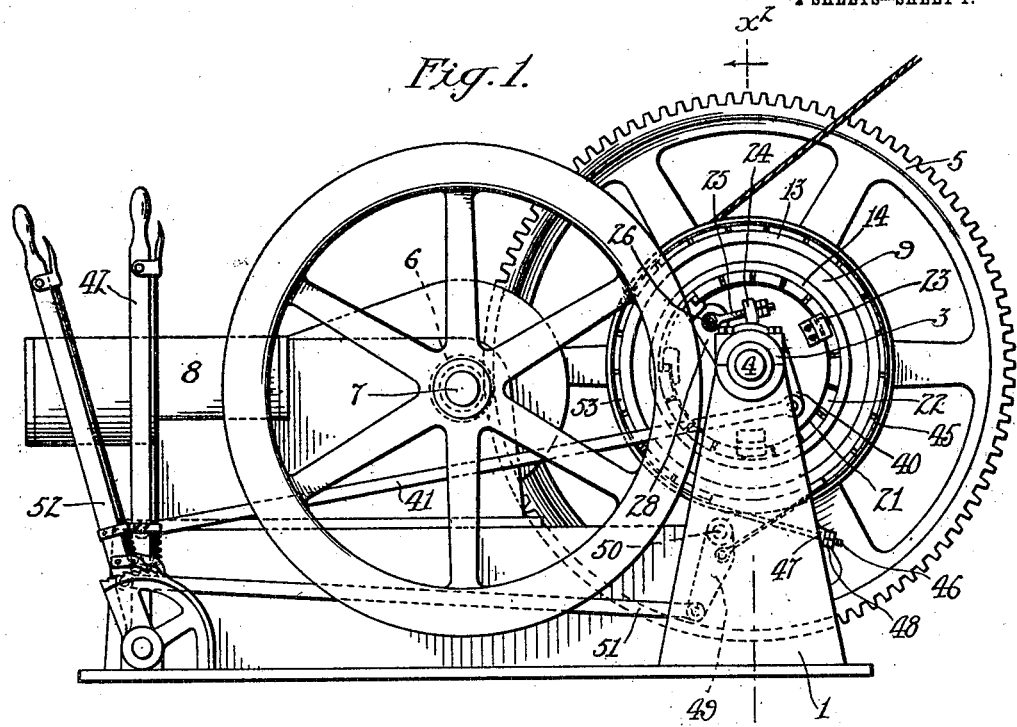
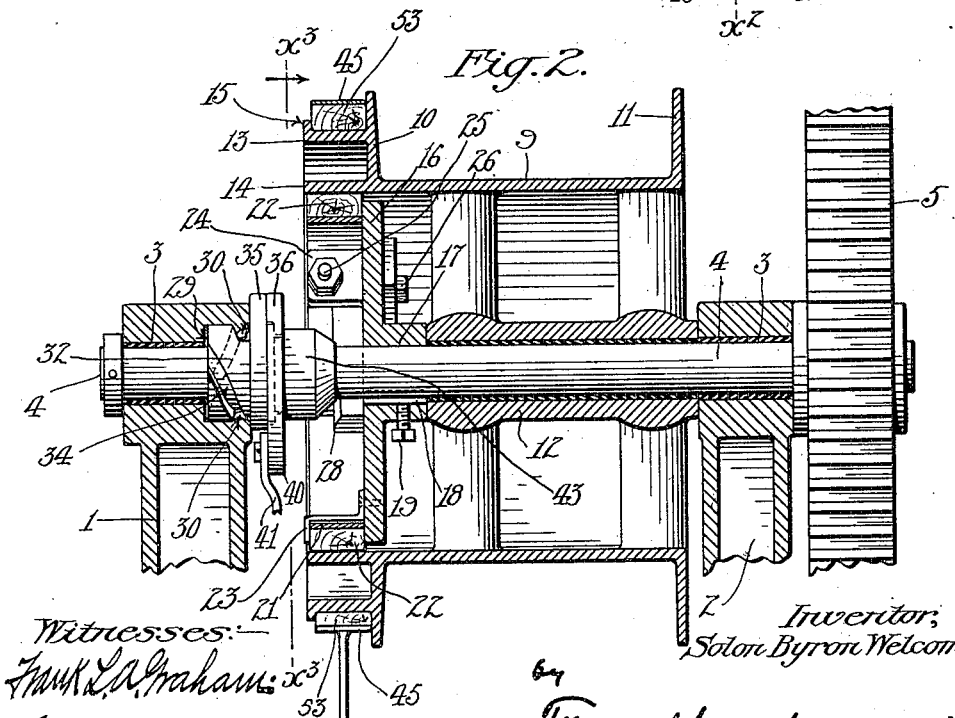
Witnesses:
Frank L. A. Graham
J. D. Mansfield
Inventor:
Solon Byron Welcome.
by Townsend, Hackley & Wright
Attys.

No. 838,483. PATENTED DEC. 11, 1906.
S. B. WELCOME.
COMBINED CLUTCH AND BRAKE.
APPLICATION FILED JUNE 20, 1906.
2 SHEETS—SHEET 2.
Fig. 3.
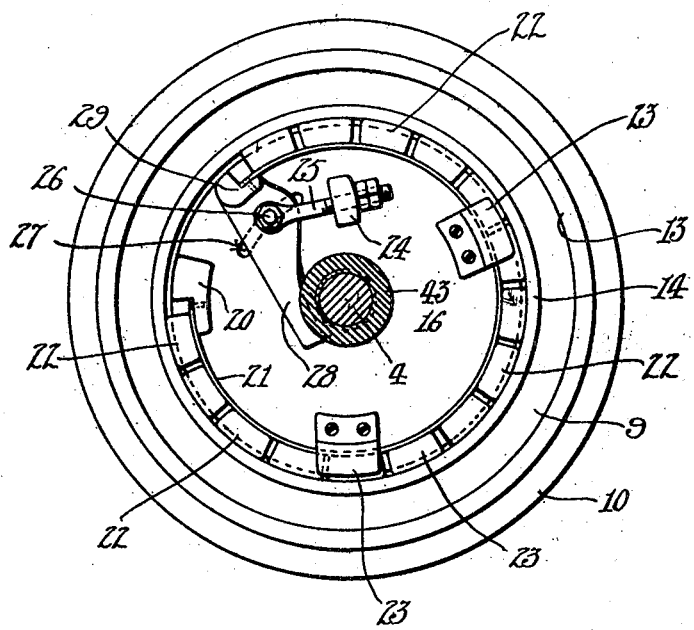
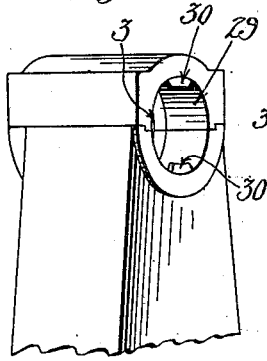 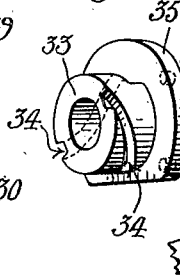 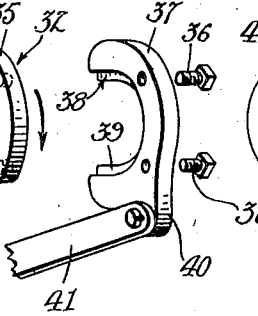 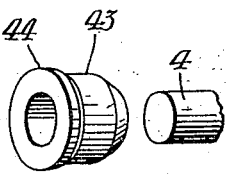
Fig. 4. Fig. 5. Fig. 6. Fig. 7. Fig. 8.
Witnesses:—
Frank L. A. Graham
F. A. Mansfield
Inventor;
Solon Byron Welcome.
by
Townsend, Yankackley & Wright
Attys.

UNITED STATES PATENT OFFICE.

SOLON BYRON WELCOME, OF LOS ANGELES, CALIFORNIA, ASSIGNOR TO WESTERN GAS ENGINE COMPANY, OF LOS ANGELES, CALIFORNIA, A CORPORATION OF CALIFORNIA.

COMBINED CLUTCH AND BRAKE.

No. 838,483.     Specification of Letters Patent.     Patented Dec. 11, 1906.

Application filed June 20, 1906. Serial No. 322,644.

*To all whom it may concern:*

Be it known that I, SOLON BYRON WELCOME, a citizen of the United States, residing at Los Angeles, in the county of Los Angeles and State of California, have invented a new and useful Combined Clutch and Brake, of which the following is a specification.

This invention relates to friction clutches or brakes; and the main object of the invention is to provide a device of the character described which is very simple in construction, with no intricate or small parts, which is strong and durable, and the parts of which are easily accessible for inspection or to make repairs when necessary, and to so construct the device that when repairs are needed they may be made by a person with ordinary skill.

The invention is applicable to various uses in which a friction clutch or brake is required—such, for example, as on hoists—and in the present case I have shown and described the invention as applied to a hoist operated by an explosive-engine.

The accompanying drawings illustrate the invention.

Referring to the drawings, Figure 1 is a side elevation of the hoist equipped with my invention. Fig. 2 is a vertical section taken laterally through the hoist on line $x^2 x^2$, Fig. 1. Fig. 3 is a detail view, partly in section, on line $x^3 x^3$, Fig. 2. Fig. 4 is a perspective view of the upper portion of one of the drum-shaft supports and its journal. Fig. 5 is a perspective view of the clutch-screw in detail. Fig. 6 is a perspective view of the cone-retainer, showing a part of the clutch-rod connected thereto. Fig. 7 is a perspective view in detail of the cone. Fig. 8 is a perspective view of the end of the drum-shaft.

1 and 2 designate standards provided with bearings 3, in which is mounted a drum-shaft 4, one end of which carries a gear 5, which meshes with a pinion 6 on the crank-shaft 7 of the engine 8.

Mounted between the standards 1 and 2 on the drum-shaft 4 is a drum 9 with flanges 10 and 11. The hub 12 of the drum, as shown in Fig. 2, does not extend the full width of the drum, but terminates short of the end nearest the standard 1. On the outside of the flange 10 is a brake-band 13 and a clutch-band 14, both of which bands are preferably cast integrally with the drum, as shown. The brake-band 13 has an outer retaining-flange 15. Keyed to the shaft 4 is a clutch-disk 16, the hub 17 of which lies adjacent the end of the drum-hub 12. The hub 17 being keyed to the shaft 4 by a key 18, which is held in place by a set-screw 19, serves, together with the journal 3, to prevent end play of the drum 9. The clutch-disk 16, as shown in Fig. 3, is provided with a lug 20, to which one end of a clutch-strap 21 is fastened. The clutch-strap 21 on its outer face carries a series of friction-blocks 22, which may be formed of fiber or other suitable material. Retaining-brackets 23, which are screwed to the clutch-disk 16, serve to guide the clutch-strap and hold it against undue lateral play. The clutch-disk 16 is also provided with a lug 24, through which passes an adjustable eyebolt 25, which supports a fulcrum-bolt 26, the latter passing also through a segmental slot 27, formed in the clutch-disk. Pivoted to the fulcrum-bolt 26 is a clutch-lever 28, one end of which has a shoulder 29, to which is fastened the other end of the clutch-band 21. The opposite end of the clutch-lever 28 is beveled, as shown in Figs. 2 and 3. By swinging the lower end of the clutch-lever 28 away from the shaft 4 the clutch-band 21 is expanded, so that the friction-blocks 22 are forced against the clutch-band 14. The slot 27 in the clutch-disk 16 enables the fulcrum-bolt 26 to be adjusted by the eyebolt 25.

As shown in Figs. 2 and 4, the inner part of the bearing 3 is cupped out to form a recess 29, into which recess project a pair of lugs 30, forming segmental thread portions, the lower lug 30 being cast, preferably, integrally with the standard 1. Mounted loosely on the shaft 4 is a clutch-screw 32, (shown in detail in Fig. 5,) which consists of a sleeve 33, having two spiral grooves 34 and a flange 35. The sleeve 33 lies within the recess 29, the segmental screw-lugs 30 engaging in the spiral grooves 34 of the sleeve. Fastened to the flange 35 by screws 36 is a cone-retainer 37, (shown in detail in Fig. 6,) having an undercut recess 38, formed by a flange 39. The cone-retainer 37 is formed with a lug 40, to which is pivotally connected a clutch-rod 41, the other end of the clutch-rod 41 being connected with a suitable hand-lever 42, as shown in Fig. 1. A cone 43 (shown in detail in Fig. 7) is provided with a flange 44, the cone being loosely mounted on the shaft 4 and its flange 44 engaging behind the flange 39 of the cone-retainer 37.

By throwing the clutch-lever 42 to the left of its position in Fig. 1 the clutch-rod 41 rocks the clutch-screw 32 in the direction of the arrow in Fig. 5, thereby causing the clutch-screw to move outward in its recess 29 as the spiral grooves ride along the screw-lugs 30, and as the clutch-screw moves out the cone 43 is moved with it along the shaft 4 and the cone gradually rocks the free end of the clutch-lever 28 away from the shaft 4, thereby expanding the clutch-strap 21 and forcing the friction-blocks 22 with a gradual increasing pressure against the clutch-band 14, thereby causing the drum 9 to rotate at a speed proportionate to the pressure of the friction-blocks 22 against the clutch-band 14 and obviously to cause the drum 9 to rotate in unison with the shaft 4 when the friction-blocks 22 are forced against the clutch-band 14 with sufficient pressure to lock the same.

A brake-strap 45 has at one end a threaded extension 46, which passes through a lug 47, formed on the standard 1, and is held in place by nuts 48. The other end of the brake-strap 45 is pivotally connected to a brake-lever 49, which is pivoted at 50 to the standard 1. The brake-lever 49 is connected by a brake-rod 51 with a hand-lever 52. The brake-strap 45 is provided with friction-blocks 53.

By gradually pulling over the lever 42 the clutch will take hold gradually, and thus start the load without jerk or strain, to the parts of the hoist or engine, and the speed at which the load is moved can be controlled to a nicety by regulating the position of the lever 42 to secure the requisite degree of slippage of the clutch, or if the load is to be moved at maximum speed the clutch may be locked to rotate at the same speed as the shaft 4, and when so locked the speed of the load may be regulated by regulating the speed of the engine. When the load is to be lowered, the clutch may be released sufficiently to allow the drum to move in a reverse direction, which speed of movement obviously can be controlled by exerting the proper amount of pressure by means of the lever 42. It is preferable, however, to control the descent of the load by means of the brake, as the brake affords a larger gripping-surface, and the wear is therefore much less, thus preserving the friction-clutch as much as possible for its regular duty. It is obvious that either the clutch or the brake can be employed in emergencies to check the descent of the load in case of breakage or failure of clutch or brake to act.

What I claim is—

1. A driving element, a driven element, a gripping device carried by one of said elements and adapted to engage the other element, a shaft for said elements, a bearing for said shaft, said bearing having a recess, means for operating said gripping device comprising a cone, a clutch-screw carrying said cone and entering said recess, said clutch-screw having a hub provided with spiral grooves which engage segmental lugs formed in said bearing, and means for turning said screw to move it and the cone longitudinally of the shaft and operate the grip device.

2. A shaft, a driven element loosely mounted on said shaft, a driving element rigidly mounted on said shaft and comprising a clutch-disk having a plurality of lugs, a clutch-strap having one end connected to one of said lugs, a screw-bolt fastened to the other lug, a fulcrum-bolt passing through the screw-bolt and through a slot in said driving-disk, a clutch-lever pivoted to said fulcrum-bolt, the other end of said clutch-strap being connected to said clutch-lever, a cone slidable on said shaft for rocking said clutch-lever, and means for sliding said cone.

3. A driving element, a driven element, a gripping device carried by one of said elements and adapted to engage the other element, a shaft for said elements, a bearing for said shaft, said bearing having a recess, means for operating said gripping device comprising a cone, a clutch-screw provided with a hub having spiral grooves, said hub projecting into said recess and said grooves engaging with lugs formed in said recess, said cone being revolubly connected to said clutch-screw, and means for turning said screw to move it and the cone longitudinally of the shaft to operate the gripping device.

4. A driving element, a driven element, a gripping device carried by one of said elements and adapted to engage the other element, a shaft for said elements, a bearing for said shaft, said bearing having a recess, a clutch-screw having a hub provided with spiral grooves, said hub projecting into said recess and its spiral grooves engaging segmental lugs formed in said recess, a cone-retainer comprising a substantially semicircular member being undercut to form a retaining-flange, said member having an arm, the cone-retainer being fastened to said clutch-screw, a cone provided with a flange which seats behind the retainer-flange of said cone-retainer, and suitable hand-lever mechanism connected to the arm of said cone-retainer for turning said clutch-disk to cause said cone to be slid along said shaft to operate said gripping device.

5. A shaft, a driven element loosely mounted on said shaft, a driving element rigidly mounted on said shaft and comprising a clutch-disk having a plurality of lugs, a clutch-strap having one end connected to one of said lugs, a screw-bolt fastened to the other lug, a fulcrum-bolt passing through the screw-bolt and through a slot in said driving-disk, a clutch-lever pivoted to said fulcrum-bolt, the other end of said clutch-strap being connected to said clutch-lever, a cone slidable on said shaft for rocking said clutch-lever, means for sliding said cone, and retaining-brackets fastened to said clutch-disk and extending over the edge of said clutch-strap.

6. A shaft, a drum revolubly mounted on said shaft, a clutch-disk within said drum secured to said shaft, a pair of concentric friction-bands extending outward from the drum, a clutch-strap adapted to bear against the inner face of the inner friction-band, one end of said clutch-strap being connected to said clutch-disk, a clutch-lever pivoted to said clutch-disk and connected to the other end of said clutch-strap, a fulcrum-bolt supporting said clutch-lever and extending through a segmental slot in said clutch-disk, a lug on said clutch-disk, an adjusting-bolt passing through said lug and connected to said fulcrum-bolt, a cone on said shaft adapted to be moved against said clutch-lever to operate the same and expand said clutch-strap, a bearing for said shaft, the bearing having a recess with screw-engaging means, a clutch-screw revolubly connected with said cone, said clutch-screw entering said recess and engaging with the screw-engaging means thereof, a suitable hand-lever mechanism for turning the clutch-screw to operate said cone, a brake-band adapted to engage the outer face of the outer friction-band, and suitable hand-lever mechanism for operating said brake-band.

In testimony whereof I have hereunto set my hand, at Los Angeles, California, this 2d day of June, 1906.

SOLON BYRON WELCOME.

In presence of—
GEORGE T. HACKLEY,
ARTHUR P. KNIGHT.